United States Patent [19]

Byrne et al.

[11] Patent Number: 5,294,347
[45] Date of Patent: Mar. 15, 1994

[54] DISPERSION POLYMERS FOR ETHYLENE QUENCH WATER CLARIFICATION

[75] Inventors: Norman E. Byrne, Houston, Tex.; Belinda K. Williams, Hampton, S.C.; Sherri L. Fisher, Sugar Land, Tex.

[73] Assignee: Nalco Chemical Company, Naperville, Ill.

[21] Appl. No.: 992,276

[22] Filed: Dec. 16, 1992

[51] Int. Cl.$^5$ ............................................. C02F 1/56
[52] U.S. Cl. .................................. 210/708; 210/728; 210/734; 252/341; 252/358
[58] Field of Search ............... 210/708, 712, 725, 727, 210/728, 734; 252/341, 358

[56] References Cited

U.S. PATENT DOCUMENTS

| | | | |
|---|---|---|---|
| 4,059,515 | 11/1977 | Fowler et al. | 252/358 |
| 4,120,815 | 10/1978 | Raman | 252/341 |
| 4,588,508 | 5/1986 | Allenson et al. | 210/708 |
| 4,715,962 | 12/1987 | Bhattacharyya et al. | 210/708 |
| 4,929,655 | 5/1990 | Takeda et al. | 524/458 |
| 4,931,191 | 6/1990 | Braden et al. | 210/725 |
| 5,006,590 | 4/1991 | Takeda et al. | 524/458 |
| 5,032,285 | 7/1991 | Braden et al. | 210/708 |

*Primary Examiner*—Peter A. Hruskoci
*Attorney, Agent, or Firm*—Robert A. Miller; Joseph B. Barrett

[57] ABSTRACT

One aspect of the invention provides a method of removing emulsified oil from ethylene quench water. According to the method, the oil-containing water is treated with an effective amount of a dispersion of a water-soluble cationic polymer.

7 Claims, No Drawings

DISPERSION POLYMERS FOR ETHYLENE QUENCH WATER CLARIFICATION

BACKGROUND OF THE INVENTION

1. Field of the Invention

The invention is directed to compositions and methods for removing emulsified oils from the quench waters used in ethylene manufacturing operations; and more particularly, the invention is directed to a method of removing emulsified oils from the quench waters of an ethylene water quench tower using water-soluble polymers dispersed in a concentrated salt media.

2. Description of the Prior Art

In ethylene manufacturing plants, a water quench column cools the gas leaving a primary fractionator. In many plants, a primary fractionator is not used, and the feed to the water quench column is directly from a transfer line exchanger. In either case, if the quench process is either incomplete or too severe, excessive product degradation can occur, resulting in fouling of both the quench tower and the downstream compressors.

In the base of the tower, hot quench water is separated from condensed hydrocarbon oils, such as, pyrolysis gasoline, which have condensed along with the dilution steam. Once the oils are removed from the water, the water can be recycled to a dilution steam generator system, while the oil can be returned to the primary fractionator as reflux. However, the oil and water can be emulsified, and poor separation of the two phases will increase fouling in the dilution steam generator and quench water exchangers, as well as increasing stripping steam requirements. In addition, because the water absorbs acidic compounds, corrosion is a potential problem.

In the ethylene manufacturing industry, quench waters generated in ethylene manufacture operations contain heavy, middle, and light hydrocarbons. The different hydrocarbons found are due to the different feeds of a particular plant. A plant that cracks heavy oils compared to a plant that cracks only ethane will have much heavier hydrocarbons condensed and emulsified in the quench water. In general, the hydrocarbons are aromatic compounds, such as naphthalene and anthracene or light hydrocarbons composed of pentanes and piperylenes.

These emulsified hydrocarbons are different from those that are found in oil field produced water. Oil field produced waters contains asphaltenes, heavy polyaromatic hydrocarbons, resins and very long chain paraffins. These hydrocarbons are almost never found in ethylene quench waters.

These quench water-oil emulsions can be broken with the demulsifiers of the present invention. The demulsifing compositions and methods of the present invention provide faster, more complete water-oil separation, better level control in the unit, lower stripping steam requirement and less downstream fouling.

SUMMARY OF THE INVENTION

One aspect of the invention provides a method of removing emulsified oil from ethylene quench water. According to the method, the oil-containing water is treated with an effective amount of a dispersion of a water-soluble cationic polymer. The dispersion of the water-soluble cationic polymer is prepared by polymerizing a water-soluble monomer mixture containing at least 5 mole % of a cationic monomer represented by general formula (I) and at least 5 mole % of acrylamide or methacrylamide in an aqueous solution of a polyvalent anionic salt. The polymerization is carried out in the presence of a dispersant polymer. The dispersant polymer is a water-soluble cationic polymer which is soluble in the aqueous solution of the polyvalent anionic salt. Also, the dispersant polymer contains at least 20 mole % of cationic monomer units represented by general formula (II):

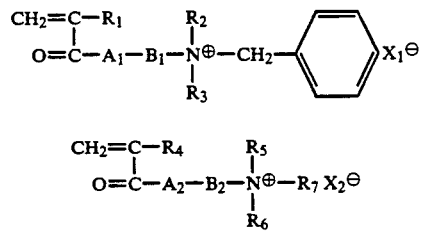

wherein $R_1$ and $R_4$ are each H or $CH_3$; $R_2$, $R_3$, $R_5$ and $R_6$ are each an alkyl group having 1 to 2 carbon atoms; $R_7$ is a hydrogen atom or an alkyl group having 1 to 2 carbon atoms; $A_1$ and $A_2$ are each an oxygen atom or NH; $B_1$ and $B_2$ are each 2 to 4 carbon atoms or a hydroxypropyl group and $X_1$- and $X_2$-are each a counter anion.

A further aspect of the invention provides that the polymerization is further carried out in the presence of a seed polymer. The seed polymer is a water-soluble cationic polymer which is insoluble in the aqueous solution of the polyvalent anionic salt. The seed polymer also contains at least 5 mole % of cationic monomer units represented by the general formula (I).

According to one preferred embodiment, the water-soluble monomer mixture further contains at least 5 mole % of a cationic monomer represented by the general formula (II). The multivalent anionic salt preferably comprises a phosphate, a sulfate or a mixture thereof.

DESCRIPTION OF THE PREFERRED EMBODIMENTS

The present invention provides a superior method for removing emulsified oil from ethylene quench water. A new class of water-soluble dispersion polymers have been discovered to be more effective in removing emulsified oil from ethylene quench waters than currently available chemical treatments.

The water-soluble dispersion polymers of the invention effectively enhance hydrocarbon separation in an oil-in-water emulsion formed during processing in an ethylene unit. The polymers are particularly effective in the oil/water separator downstream from the water quench tower. Visual clarity values, which provide a relative measurement of water clarity (1=very hazy; 5=water white), range from 3-5 at 5-200 ppm. In addition, the polymers of the invention have successfully reduced Total Oil and Grease (TOG) in the emulsified water samples by as much as 85%.

As will be discussed in more detail below, the polymer dispersion of the invention is prepared in an aqueous solution of a polyvalent anionic salt. The polymer dispersion achieves fine particle sizes and aqueous solubilities not available with other polymers used for this application. The polymer dispersion used in the present invention is shown in the Examples to remove twice as much emulsified oil from quench water as currently available chemical treatments.

According to the method, the polymers of the invention are added to the water from an ethylene quench water tower. The polymers are added in an effective amount of from 0.5 to about 1000 ppm. More preferably, the amount of the polymer in the produced water is from 1 to about 200 ppm; and most preferably from about 10 to about 75 ppm. It does appear that at some higher doses the beneficial affect plateaus, and on a cost basis such higher doses, probably above about 1000 ppm, are not cost effective. The polymers of the invention are preferably added to the water in neat form. However, in some applications, the polymers can be added as an aqueous solution.

Once the polymers of the invention are added to the ethylene quench water, the treated water is naturally agitated as it moves through the ethylene manufacturing system. The polymers of the invention will cause the emulsified oil to separate from the water and float to the surface of the water as a flock. The flock is subsequently removed from the surface of the water and returned to ethylene manufacturing plant. The treated water can now be recycled into a dilution steam generator. The preferred polymers of the invention are manufactured by Hymo Corporation, Japan. Preferred polymer preparations are available from Hymo Corporation under the trade name designations DR-2570, DR-3000 and DR-4000. Methods for manufacturing the polymer dispersion used in the invention is described in detail in U.S. Pat. Nos. 5,006,590 and 4,929,655, assigned to Kyoritsu Yuki Co., Ltd., Tokyo, Japan. The disclosures of these two patents are incorporated herein.

According to the invention, the polymer dispersion used to treat the produced water is prepared from a water-soluble monomer mixture containing at least 5 mole % of a cationic monomer represented by the general formula (I):

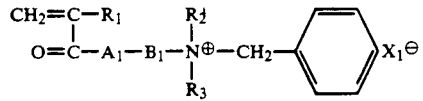

(I)

wherein $R_1$ is H or $CH_3$; $R_2$ and $R_3$ are each an alkyl group having 1 to 2 carbon atoms; $A_1$ is an oxygen atom or NH; $B_1$ is an alkyl group having 2 to 4 carbon atoms or a hydroxypropyl group and $X_1$ is a counter anion. The above water-soluble monomer mixture is soluble in the aqueous solution of the polyvalent anionic salt. The polymer generated from the monomer mixture is, however, insoluble in the aqueous polyvalent anionic salt solution. The polymer of the monomer mixture can also be used as the seed polymer. The seed polymer is described in detail below.

The above cationic monomer represented by the general formula (I) preferably is a quaternary ammonium salt obtained by the reaction of benzyl chloride and dimethylaminoethyl acrylate, diethylaminoethyl acrylate, dimethylaminohydroxypropyl acrylate, dimethylaminopropyl acrylamide, dimethylaminoethyl methacrylate, diethylaminoethyl methacrylate and dimethylaminopropyl methacrylamide.

Monomers preferably copolymerized with the cationic monomer represented by the general formula (I) includes acrylamide, methacrylamide and the cationic monomers represented by the general formula (II):

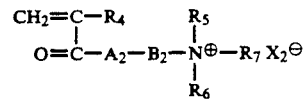

wherein $R_4$ is H or $CH_3$; $R_5$ and $R_6$ are each an alkyl group having 1 to 2 carbon atoms; $R_7$ is H or an alkyl group having 1 to 2 carbon atoms; $A_2$ is an oxygen atom or NH; $B_2$ is an alkyl group having 2 to 4 carbon atoms or a hydroxypropyl group and $X_2$ is a counter anion.

Preferable monomers represented by the formula (II) include the ammonium salts of dimethylaminoethyl acrylate, diethylaminoethyl acrylate, dimethylaminopropyl acrylamide, diethylaminopropyl acrylamide and dimethylhydroxypropyl acrylate, dimethylaminoethyl methacrylate, diethylaminoethyl methacrylate, dimethylaminopropyl methacrylamide, diethylaminopropyl methacrylamide and dimethylhydroxypropyl methacrylate as well as the methylated and ethylated quaternary salts. Among the more preferable cationic monomers represented by the general formula (II) are the salts and methylated quaternary salts of dialkylaminoethyl acrylate and dialkylaminoethyl methacrylate. The concentration of the above-mentioned monomers in the polymerization reaction mixture is suitably in the range of 5 to 30% by weight.

The polyvalent anionic salt to be incorporated in the aqueous solution according to the present invention is suitably a sulfate, a phosphate or a mixture thereof. Preferable salts include ammonium sulfate, sodium sulfate, magnesium sulfate, aluminum sulfate, ammonium hydrogenphosphate, sodium hydrogenphosphate and potassium hydrogenphosphate. In the present invention, these salts may be each used as an aqueous solution thereof having a concentration of 15% or above.

A dispersant polymer is present in the aqueous anionic salt solution in which the polymerization of the above monomers occurs. The dispersant polymer is a water-soluble high molecular weight cationic polymer. The dispersant polymer is soluble in the above-mentioned aqueous salt solution. The dispersant polymer is preferably used in an amount of from 1 to 10% by weight based on the total weight of the monomers. The dispersant polymer is composed of 20 mole % or more of cationic monomer units represented by the formula (II). Preferably the residual mole % is acrylamide or methacrylamide. The performance of the dispersant is not greatly affected by molecular weight. However, the molecular weight of the dispersant is preferably in the range of 10,000 to 10,000,000. According to one embodiment of the invention a multifunctional alcohol such as glycerin or polyethylene glycol is coexistent in the polymerization system. The deposition of the fine particles is smoothly carried out in the presence of these alcohols.

For the polymerizations a usual water-soluble radical-forming agent can be employed, but preferably water-soluble azo compounds such as 2,2'-azobis(2-amidinopropane) hydrochloride and 2,2'-azobis(N,N'-dimethyleneisobutylamine) hydrochloride are used.

According to one embodiment of the invention, a seed polymer is added before the beginning of the polymerization of the above monomers for the purpose of obtaining a fine dispersion. The seed polymer is a water-soluble cationic polymer insoluble in the aqueous solution of the polyvalent anionic salt. The seed polymer is preferably a polymer prepared from the above monomer mixture by the process described herein. Nevertheless, the monomer composition of the seed polymer need not always be equal to that of the water-soluble cationic polymer formed during polymerization. However, like the water-soluble polymer formed during polymerization, the seed polymer should contain at least 5 mole percent of cationic monomer units represented by the general formula (I). According to one embodiment of the invention, the seed polymer used in one polymerization reaction is the water-soluble polymer prepared in a previous reaction which used the same monomer mixture.

The following Examples are presented to describe preferred embodiments and utilities of the invention and are not meant to limit the invention unless otherwise stated in the claims appended hereto.

EXAMPLE 1

The treating abilities of the polymers of the invention and latex polymer preparations where evaluated by alternately hand shaking and visually comparing water clarity through several sets of agitation. Two (2) to about five (5) gallons of ethylene quench water was collected. Six (6) ounce clear glass bottles were filled with 100 ml of water and inverted several times to coat the bottles with emulsified oils. The treating chemicals were added to individual bottles as 10% or 1% aqueous solutions. The treating chemicals compared were NALCO ® 3390 and NALCO ® 3391, obtained from Nalco Chemical Company, Naperville, Ill. and DR-3000, DR-2570 and DR-4000, obtained from the Hymo Corporation, Japan. NALCO 3390 and NALCO 3391 are latex polymer preparations which are commonly used in ethylene plants for this application. DR-3000, DR-2570 and DR-4000 are commercial preparations of the dispersion of the water-soluble cationic polymer used in the invention. The bottles were capped, numbered and agitated. All samples were agitated identically. The agitation was intended to match water agitation in ethylene plant operations. The agitation was done in sets with observation and evaluation done after each set. Observations such as water clarity, unbroken emulsion, dispersed oil droplets and relative qualities of oil left in the water were reduced to quick numerical grades of 1-5, with 5 being the best. The final concentration of treated chemicals in the waste water was 10-20-30-40-50 and 75 ppm. After several sets of agitation, done in quick succession, to avoid cooling and aging of the emulsion, water clarity, the size and persistency of the flock, and relative clarity of the water were recorded.

Table I below summarizes the data collected. As shown in Table I, the dispersion of the cationic water-soluble polymers used in the invention were equal to or better to the latex polymer preparations currently being sold for this application when a visual test is used as the criteria.

TABLE I

| Dose | 10 ppm | 20 ppm | 30 ppm | 40 ppm | 50 ppm | 75 ppm |
|---|---|---|---|---|---|---|
| Blank | 1 | 1 | 1 | 1 | 1 | 1 |
| NALCO 3391 | 1 | 2 | 3 | 4 | 4-5 | 4-5 |
|  | 1 | 1 | 1 | 2 | 3-4 | 4-5 |
| NALCO 3390 | 2 | 3 | 3-4 | 3 | 3-4 | 3 |
|  | 2 | 3 | 3 | 3 | 3 | 2 |
| DR-2570 | 1-2 | 3 | 4 | 4-5 | 5 | 5 |
|  | 2-3 | 3 | 3 | 3 | 3-4 | — |
|  | 2-3 | 4 | 5 | 5 | 5 | 5 |
|  | 2 | 3 | 3 | 4 | 4 | — |
| DR-4000 | 2 | 2 | 2 | 2 | 1 | — |
|  | 1 | 1 | 1 | 1 | 2 | — |
| DR-3000 | 2 | 2 | 2 | 2 | 2 | — |
|  | 1 | 1 | 1 | 1 | 4 | — |

EXAMPLE 2

For each sample, 100 ml of ethylene quench water was placed into a 6 ounce vial and shaken well. Each sample was dosed with a treating chemical as a 1% aqueous solution. The samples were dosed at from 1 to 300 ppm. The chemical treating agents used were NALCO 3390, NALCO 3391, and DR-2570. After shaking the sample, the samples were allowed to rest. On top of each sample was flocculated oil. 50 ml of treated water was taken from beneath the surface of each. The 50 ml of treated water was extracted with 25 ml of Freon ®113 obtained from Fisher Scientific Corporation. The extract obtained was filtered through Whatman ® Filter Paper No.541. The filtered extract was placed in a quartz cuvette and placed in Miran ® fixed wavelength infrared spectrophotometer (wavelength 2874 cm$^{-1}$). The absorbance of the filtered extract was obtained. The absorbance was compared to a dosage curve to determine the amount of residual emulsified oil remaining in the water sample. The dosage curve was prepared prior to the experiment by taking known amounts of oil in water and obtaining the infrared absorbance. The data obtained is summarized in Table 2. As Table 2 shows, at all dosage levels, the dispersion polymers used in the invention were superior to the latex preparations currently being used for this application.

TABLE II

|  | Blank | (Dose ppm) | | | | | | | | | |
|---|---|---|---|---|---|---|---|---|---|---|---|
|  |  | 1 | 5 | 10 | 20 | 30 | 40 | 50 | 100 | 200 | 300 |
| NALCO 3391 | 1780 |  | 575 | 544 |  | 424 |  | 273 | 45 |  |  |
|  | 426 | 471 | 398 | 417 |  |  |  | 136 | 142 | 146 | 229 |
|  | 466 |  | 397 | 338 |  |  |  | 116 | 62 | 198 |  |
| NALCO 3390 | 426 | 258 | 233 | 189 | 193 |  | 211 | 216 | 255 | 275 |  |
| DR-2570 | 426 | 346 | 142 | 130 | 123 |  |  | 72 | 93 | 358 |  |
|  | 466 | 433 | 96 | 118 |  |  |  | 211 | 218 | 244 |  |

(TOG spec ppm)

We claim:

1. A method of removing emulsified oil from ethylene quench water, the method comprising the step of treating the oil-containing water with an effective amount of a dispersion of a water-soluble cationic polymer, said dispersion of the water-soluble cationic polymer being prepared by polymerizing a water-soluble monomer mixture containing a least 5 mole % of a cationic monomer represented by general formula (I) and at least 5 mole % of acrylamide or methacrylamide in an aqueous solution of a polyvalent anionic salt, said polymerization is carried out in an aqueous solution including from about 1 to about 10 percent by weight based on the total weight of the monomers a dispersant polymer, said dispersant polymer being a water-soluble cationic polymer which is soluble in said aqueous solution of the polyvalent anionic salt and which contains at least 20 mole % of cationic monomer units represented by a general formula (II):

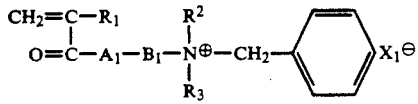
(I)

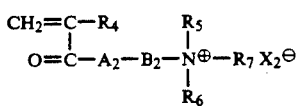
(II)

wherein $R_1$ and $R_4$ are each H or $CH_3$; $R_2$, $R_3$, $R_5$ and $R_6$ are each an alkyl group having 1 to 2 carbon atoms; $R_7$ is a hydrogen atom or an alkyl group having 1 to 2 carbon atoms; $A_1$ and $A_2$ are each an oxygen atom or NH; $B_1$ and $B_2$ are each 2 to 4 carbon atoms or a hydroxypropyl group and $X_1^-$ and $X_2^-$ are each a counter anion, once treated, the emulsified oil flocculates; and removing the flocculated emulsified oil from the treated ethylene quench water.

2. The method of claim 1 wherein said aqueous solution further includes a seed polymer; said seed polymer being a water-soluble cationic polymer which is insoluble in said aqueous solution of the polyvalent anionic salt and which contains at least 5 mole % of cationic monomer units represented by the general formula (I).

3. The method of claim 1 wherein the water-soluble monomer mixture further contains at least 5 mole % of a cationic monomer represented by the general formula (II).

4. The method of claim 1 wherein the polyvalent anionic salt comprises a phosphate, a sulfate or a mixture thereof.

5. The method of claim 1 wherein the effective amount of the dispersion of the water-soluble cationic polymer added to the oil-containing water is at least 0.5 ppm.

6. The method of claim 1 wherein the effective amount of the dispersion of the water-soluble cationic polymer added to the oil-containing water is at least 10 ppm.

7. The method of claim 1 wherein the effective amount of the dispersion of the water-soluble cationic polymer added to the oil-containing water is at least 20 ppm.

* * * * *